United States Patent
Krumm et al.

(10) Patent No.: US 6,991,758 B2
(45) Date of Patent: Jan. 31, 2006

(54) METHOD OF MAKING A WEB HAVING GOOD BREATHING PROPERTIES

(75) Inventors: Klemens Krumm, Neunkirchen-Seelscheid (DE); Klaus Reifenhauser, Troisdorf (DE)

(73) Assignee: Reifenhauser GmbH & Co. Maschinenfabrik, Troisdorf (DE)

( * ) Notice: Subject to any disclaimer, the term of this patent is extended or adjusted under 35 U.S.C. 154(b) by 239 days.

(21) Appl. No.: 10/235,993

(22) Filed: Sep. 5, 2002

(65) Prior Publication Data

US 2003/0067091 A1    Apr. 10, 2003

(30) Foreign Application Priority Data

Sep. 5, 2001    (DE)    ................ 101 43 420

(51) Int. Cl.
| | |
|---|---|
| B29C 47/06 | (2006.01) |
| B29C 55/06 | (2006.01) |
| B29C 55/14 | (2006.01) |
| B29C 67/20 | (2006.01) |
| C08J 5/18 | (2006.01) |

(52) U.S. Cl. ............ 264/154; 264/173.15; 264/173.16; 264/210.1; 264/210.6; 264/210.7; 264/284; 264/288.4; 264/288.8; 264/290.2

(58) Field of Classification Search ................ 264/154, 264/173.15, 173.16, 210.1, 210.6, 210.7, 264/284, 288.4, 288.8, 290.2
See application file for complete search history.

(56) References Cited

U.S. PATENT DOCUMENTS

| | | | |
|---|---|---|---|
| 6,258,308 B1 * | 7/2001 | Brady et al. | ............. 264/210.2 |
| 6,403,505 B1 | 6/2002 | Groitzsch et al. | |
| 6,676,871 B1 * | 1/2004 | Benassi et al. | ............. 264/154 |

FOREIGN PATENT DOCUMENTS

| | | |
|---|---|---|
| DE | 197 09 352 C2 | 1/1999 |
| DE | 199 53 039 A1 | 5/2001 |
| EP | 232 060 B1 | 9/1991 |
| EP | 950 512 A1 | 10/1999 |
| JP | 06-087184 A | 3/1994 |
| JP | 11-268199 A | 10/1999 |
| JP | 2000-502152 A | 2/2000 |
| WO | 97/22742 A2 | 6/1997 |

\* cited by examiner

*Primary Examiner*—Leo B. Tentoni
(74) *Attorney, Agent, or Firm*—Pauley Petersen & Erickson

(57) ABSTRACT

A method and a device for production of a web with good breathing properties, for example having a nonwoven web based on plastic filaments and/or plastic fibers and a plastic film, applied on one side of the nonwoven web and containing at least one mineral filler. For the production of the good breathing properties, the web is stretched in the longitudinal direction of the same, in two successive steps, and an embossing is carried out, at least in certain sectors of the surface, between the two steps which effect the stretching in the longitudinal direction.

40 Claims, 2 Drawing Sheets

METHOD OF MAKING A WEB HAVING GOOD BREATHING PROPERTIES

BACKGROUND OF THE INVENTION

1. Field of the Invention

This invention relates to a method for the production of a web with good breathing properties, which is formed from at least one layer based on a mineral filler-containing plastic film, wherein the web is stretched to obtain the breathing activity of the filler-containing plastic film. This invention also relates to an apparatus for accomplishing the method.

2. Discussion of Related Art

Webs with good breathing properties based on thermoplastics, for example composite webs, have a good air and water vapor permeability. Because of only small pore sizes, they are impermeable to liquids, at the same time, because of their surface tensions and are, for example, used in the hygiene industry, the construction industry, the clothing industry, and for various other uses.

German Patent Reference DE 197 09 352 C2 teaches a web with good breathing properties, having a nonwoven web and a plastic film, containing at least one mineral filler, and applied on one side of the nonwoven web. The good breathing properties of the composite are achieved so that the mineral filler-containing plastic film is stretched either before or after joining with the nonwoven web, wherein the plastic film is stretched because of its elasticity, but not the fillers contained in it and subsequently, pores which bring about the desired good breathing properties of the plastic film are formed on the grain boundaries of the fillers. The used nonwoven web is itself permeated by a large number of pores and thus has good breathing properties and serves primarily as a reinforcement layer for the plastic film.

A generic method and a unit for the production of a web with good breathing properties is, for example, taught by European Patent Reference EP 09 50 512 A1, in which, in a first step, a precomposite is first produced from the nonwoven web on the basis of plastic filaments and/or plastic fibers and a coating of plastic film applied on one side of the nonwoven web. The precomposite is subsequently stretched in the longitudinal and transverse directions, wherein the breathing activity of the composite sheet thus produced is obtained.

One disadvantage with previously known webs with good breathing properties is increased stiffness of the web, which is inevitably obtained by the stretching and which is manifested in a good mechanical loading capacity. But at the same time, a haptic quality that is clearly more unpleasant, in comparison to textile materials, and other undesired properties, such as a rustling tendency etc., are produced. The previously known webs with good breathing properties have only a very flat, film-like structure, which is in contrast to the production of a plastic, textile-like hand, because of the necessarily high stretching of the same.

European Patent Reference EP 02 32 060 B1 teaches obtaining a plastic film with good breathing properties, containing at least one inorganic filler, such that the film is embossed by its prestretching so as to produce a rough pattern which brings about the desired formation of the pores. The plastic film produced in this manner, however, is subjected to very strong mechanical effects in its production. By itself, it has only an insufficient strength and cannot have a textile-like and thus skin-friendly hand either.

SUMMARY OF THE INVENTION

One object of this invention is to provide a method and an apparatus for the production of a web with good breathing properties, which with the least raw material use attains the production of a voluminous structure with a textile-like hand and at the same time, a good water vapor permeability and waterproofing, good breathing properties, while avoiding the disadvantages associated with the prior art.

This object is accomplished with a method according to this invention as described in this specification and in the claims.

An apparatus to carry out the method of this invention is also described in this specification and in the claims.

To achieve this object the web of this invention is stretched in its longitudinal direction, in two successive steps, and is embossed on the surface, at least in certain areas, between the two steps which bring about the stretching in the longitudinal direction. The web is thus stretched by the introduction of the surface embossments in areas surrounding the embossing, biaxially both in the longitudinal direction and also in the width direction, as it also receives a three-dimensional structure. At the same time, the web is also subjected to stretching in the longitudinal direction two-fold in a way which is in fact known so that as a whole, a stretching sufficient for the production of good breathing properties in the plastic film of the web is attained, for example, pores are opened.

Surprisingly, it is shown that by this combined stretching in accordance with this invention, embossing and renewed stretching of the web, equally a stretch-embossing, a web with good breathing properties, which has a voluminous structure with the lowest possible use of raw materials and thus a textile-like hand and at the same time, good breathing properties and waterproofing also with respect to high water columns is obtained.

Advantageously, the method of this invention is carried out so that the web is embossed in a stretch-embossing slot, formed between two embossing rollers, wherein the web is first conducted, via a holding roller pair, to the first embossing roller, with the formation of a first stretching slot, and in the stretching slot is stretched in the longitudinal direction of the same. Then with a partial looping of the first embossing roller, the web is conducted to the stretch-embossing slot, and after passage through the stretch-embossing slot, is conducted away, with a partial looping of the second embossing roller and subsequently, is conducted via a roller pair, with the formation of a second stretching slot between the embossing roller and the roller pair and the web is again stretched in the longitudinal direction of the same in the second stretching slot.

In order to vary the degree of the embossing of the embossing structure applied on the embossing roller into the web, and thus to vary the degree of the quasi-biaxial stretching brought about by the embossing in adaptation to the thickness of the web, in accordance with this invention, the looping angles $\alpha 1$, $\alpha 2$, at which the web lies on the embossing roller are changeable.

Advantageously, both surfaces of the web are alternately embossed with embossings arranged in grids and are geometrically staggered with respect to one another and which correspond with one another so that with the formation of an indentation in one surface of the web, an elevation is formed on the other surface in the corresponding area and vice-versa. In particular, conical or truncated pyramid-like embossings can be imprinted into the web.

Whereas the embossing of the surface of the precomposite primarily brings about a microstretching of the areas of the plastic film which surround the embossing which supports the opening of the pores of the plastic film, the embossing of the surface of the precomposite, which has the nonwoven web, produces the desired voluminous and puffed structure of the same, which is responsible for the textile-like hand of the composite web with good breathing properties, according to this invention.

The stretching in the longitudinal direction and the embossing or stretch-embossing of the web is advantageously accomplished with two embossing rollers, which are driven at the same rpm and opposite rotating direction. The holding roller pair and the roller pair are driven at an rpm which, in contrast, can be adjusted independent of one another. These embossing rollers accomplish introduction of the surface embossing pattern into the web and thus the quasi-biaxial stretching of the same, and the stretching of the web also in its longitudinal direction, for which purpose the embossing rollers are driven with corresponding rpm, which is further explained below. According to the method of this invention, the embossing pattern is embossed into its surface lying on the embossing roller, and the precomposite lying on the embossing rollers is subjected to a clear stretching in the longitudinal direction so that the web with good breathing properties is produced with the desired textile-like hand.

A provision is made so that the precomposite is first imprinted on its surface which has the plastic film and subsequently on its surface which has the nonwoven web. This sequence is not critical and can also be provided conversely, if necessary.

To create a good embossing and stretching result, the web can also be preheated before the embossing and stretching, for example, during the stretching of the same from a polyolefin composite to a temperature from 80 to 100° C., for which purpose corresponding preheating devices can be provided. The stretching of the web in the longitudinal direction of the same is then carried out at a web temperature of, for example, approximately 90–98° C.

In accordance with an advantageous embodiment of the method of this invention, the web is imprinted so that depending on the shape of the embossing structure, a profile height of the embossing up to one hundred times the thickness of the nonembossed web is produced.

Because the web also experiences a microstretching in the quasi-biaxial orientation, in the longitudinal and transverse directions, by the stretch-embossing, which occurs in addition to the stretching in the longitudinal direction, the stretching required for the opening of the pores and attaining the good breathing properties in the longitudinal direction can be optionally reduced, according to the method of this invention and as opposed to the known methods, wherein the web is subjected to a reduced mechanical stress during its stretching. The voluminous structure and the textile hand are thus promoted.

According to one possible embodiment of this invention, a monolayer web with good breathing properties is produced from the filler-containing plastic film with a thickness of approximately 20–50 $\mu$m, which is stretched to create the good breathing properties in a proportion of up to 1:2 in the longitudinal direction in the two steps that bring about the stretching in the longitudinal direction in order to obtain good breathing properties. From this, stretching of up to 1:4 results, as a whole, in the longitudinal direction.

According to an alternative embodiment of this invention, a web can be used with a multilayer structure, in particular, with one layer from a nonwoven web based on plastic filaments and/or plastic fibers with a weight per unit area of 10–50 g/m$^2$ and another layer from the filler-containing plastic film, joined with it in an adhesive manner, with a weight per unit area of 5–35 g/m$^2$. To provide good breathing properties of the filler-containing plastic film which forms a layer, it is sufficient to stretch the web in the two corresponding steps in the ratio 1:1.15 to 1:1.4 in the longitudinal direction of the same with the method of this invention.

The use of the stretch-embossing of this invention between the longitudinal stretching steps produces a further reduction of the longitudinal stretching ratio up to 30%, to attain comparable values for the good breathing properties.

The stretch-embossing produces an embossing with the most varied embossing patterns on the web, for example, with gridlike embossing patterns, which are advantageously staggered with respect to one another on both surfaces of the web, for example, in the formation of an indentation in one surface of the web, in which an indentation is not formed on the other surface of the web in a corresponding area, or conversely.

For adaptation to various raw materials and layer thicknesses of the web used, the stretch-embossing of the individual surfaces can be carried out at various temperatures.

Advantageous mechanical characteristics of the web with the good breathing properties can be obtained if it is tempered after its embossing and stretching.

Preferably, polyolefins, for example, polyethylene, polypropylene, homopolymers or polymers or mixtures of the same are used for the formation of the web, both in its monolayer as well as multilayer embodiments. The plastic film of the web can contain, for example, up to 70% mineral fillers, such as calcium carbonate.

BRIEF DESCRIPTION OF THE DRAWINGS

Advantageous developments of the method of this invention and the apparatus of this invention for carrying out the method, are explained in detail in view of the schematic drawings, representing one exemplified embodiment, wherein.

DESCRIPTION OF PREFERRED EMBODIMENTS

Figure 1:
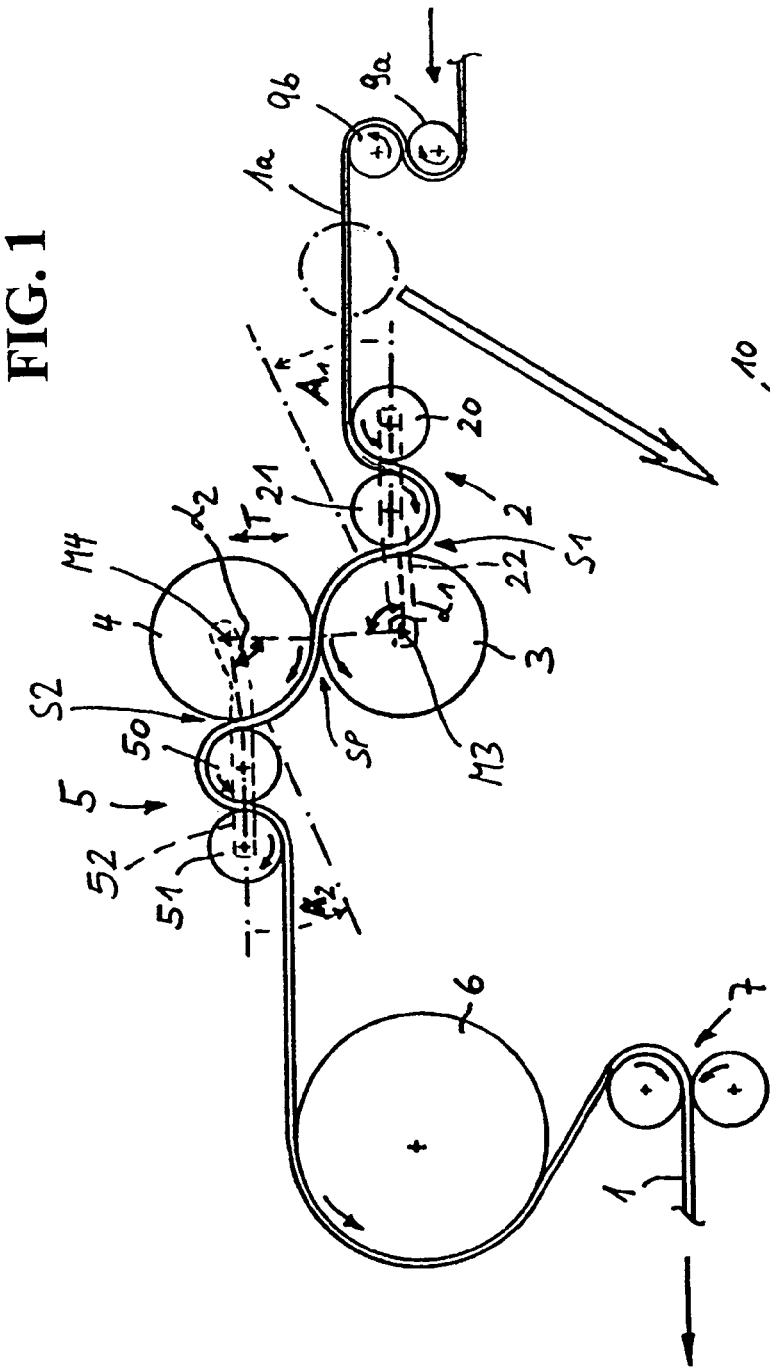
FIG. 1 is a schematic representation of an apparatus for carrying out the method of this invention.
Figure 2:
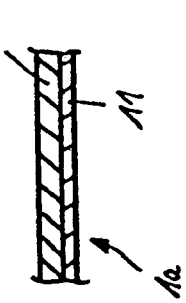
FIG. 2 is a cross-sectional view of the structure of the web, shown in FIG. 1, in an enlarged view.

In FIG. 1, in schematic representation, an apparatus is shown for the production of a web 1 with good breathing properties, from a precomposite 1a, comprising a nonwoven web 10, based on plastic filaments and/or plastic fibers, for example, made of polypropylene-homopolymer and a monolayer of multilayer plastic film 11, applied on one side on the nonwoven web 10 and containing at least one mineral filler, for example, also on PP-homopolymer and/or PP copolymer, as shown in FIG. 2.

In its parts, shown in FIG. 1 and regarded in the running direction of the web 1 or the precomposite 1a, the apparatus first comprises a preheating device with heating rollers 9a, 9b for the precomposite, a holding roller pair 2 with holding rollers 20, 21, to which the precomposite 1a is conducted from the heating rollers 9a, 9b from a supply device that is not shown, two embossing rollers 3, 4 with an intermediately formed stretch-embossing slot SP, with the holding roller pair 2 upstream, and a roller pair 5, which is downstream from the embossing rollers 3, 4. Furthermore, the apparatus comprises a tempering roller 6 and a winding device 7 for the web 1 with good breathing properties obtained. The passage direction of the precomposite 1a or the web 1 obtained therefrom and the rotating direction of all the rollers of the apparatus are shown with arrows in FIG. 1.

The precomposite 1a, which is supplied by a supply device of the apparatus which is not shown for the production of the composite web 1 with good breathing properties can be produced in one step, for example, by a separate production of the nonwoven web 10 and the plastic film 11, containing the mineral filler. A subsequent joining of the same, or also an in-line method, as is indicated for example, in European Patent Reference EP 09 50 512 A1, and its disclosure content is explicitly included in this specification by reference. Thus the plastic film 11 can contain, as a polyolefin film, for example, based on polypropylene-homopolymer and/or polypropylene copolymer, up to 70% of a mineral filler, especially calcium carbonate.

The precomposite 1a, thus formed, in a manner which is known, and as shown in FIG. 1, is first conducted via the preheating device with the heating rollers 9a, 9b, where it is preheated to ca. 80–100° C. Then, the preheated precomposite 1a arrives at the holding roller pair 2 with the holding rollers 20, 21, via which the precomposite is conducted in a partial loop and subsequently is supplied to an embossing roller 3 downstream from the first holding roller pair 2. The supply of the precomposite 1a to the embossing roller 3 occurs in such a way that the precomposite lies on the embossing roller 3 with its surface which has the mineral filler-containing plastic film 11.

Figure 3:
FIG. 3 is a schematic representation showing an embossing-stretch pattern, which is applied on the web.

The embossing roller 3 is driven so that it rotates, just like the rollers 20, 21 of the holding roller pair 2, via rotating drives which are not shown in more detail. They have an embossing structure on their surface which faces the plastic film 11 of the precomposite 1a and which contains elevations 80 arranged in a gridlike and regular manner. For example, they can have a caterpillar shape for example as shown in FIGS. 3, 4 and 5.

Figure 4:
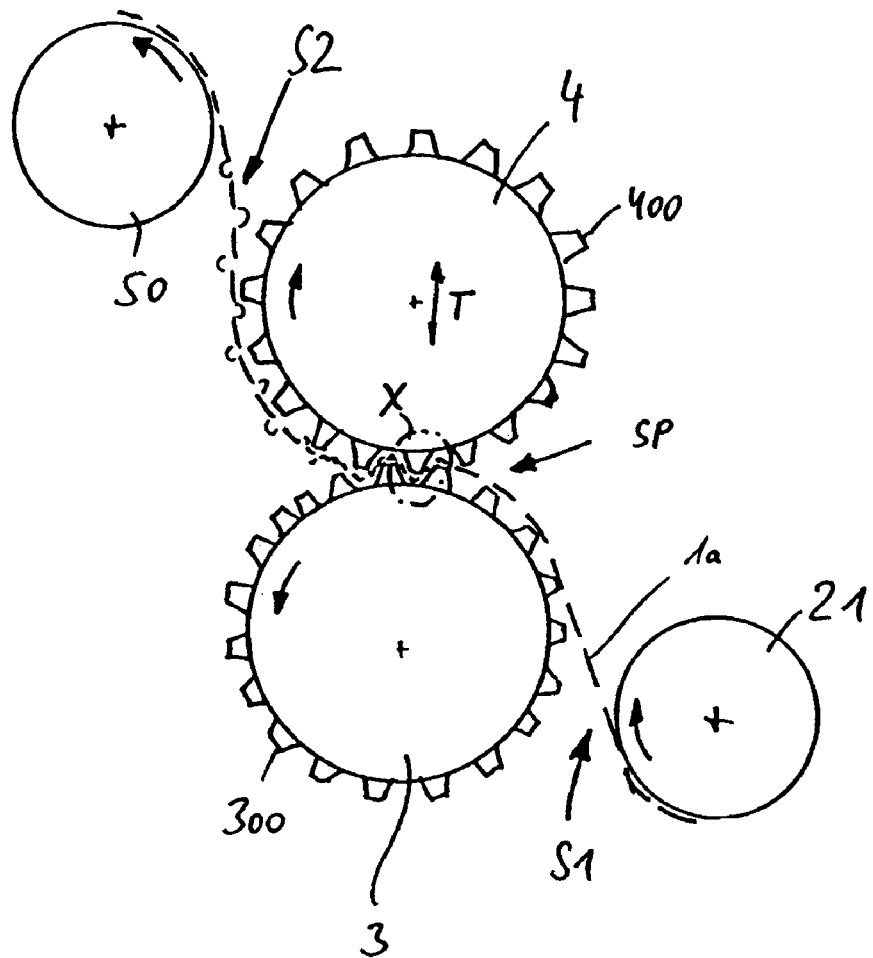
FIG. 4 is a schematic representation of an arrangement of the embossing rollers of the apparatus.
Figure 5:
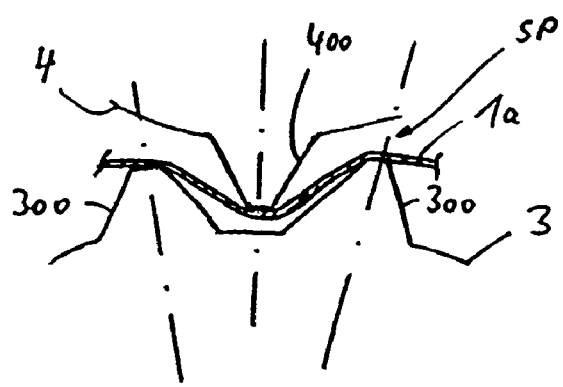
FIG. 5 shows the detail X in FIG. 4, but in an enlarged view.

A first stretching slot S1 for the precomposite 1a of the web 1, which is marked with the reference symbols S1, is formed between the holding roller 21 and the embossing roller 3, as shown in FIG. 4.

The embossing roller 3 is operated at a higher rotating speed than the holding rollers 20, 21 of the first holding roller pair 2, so that the precomposite 1a in stretching slot S1 is stretched in a definite ratio, in the longitudinal direction, between the embossing roller 3 and the holding roller 21. This stretching is advantageously in the ratio 1:1.15 to 1:1.4 and can be adjusted by separately regulatable rotating drives for embossing roller 3 and holding roller pair 2.

With the embossing pattern of the embossing roller 3, a good frictional lock is achieved between the precomposite 1a and the embossing roller 3, which supports the stretching in the longitudinal direction.

After the precomposite 1a, which is stretched in the longitudinal direction in a first step, is conducted on the surface of the embossing roller 3 at an adjustable looping angle α1, it arrives at the stretch-embossing slot SP between the embossing rollers 3, 4, which rotate in an opposite direction and at the same speed.

As shown in FIGS. 4 and 5, in an enlarged scale in comparison to FIG. 1, both the embossing roller 3 and the embossing roller 4 have projecting embossing structures 300, 400 with, for example, pyramid or truncated cone-like shapes, which are arranged staggered with respect to one another and corresponding to the embossing pattern shown in FIG. 3, and mesh into one another in the manner of cogwheels meshing with one another, so that during passage through the stretch-embossing slot SP, the precomposite 1a alternatingly receives embossings from one surface or from the opposite surface. As a result and in accordance with FIG. 3, elevations 80 and opposite indentations 81 follow one another, in an alternating manner, when regarded from one side of the web 1.

Thus the desired three-dimensional structure of the web is achieved which imparts to it the desired textile-like properties. On the other hand, however, the precomposite 1a of the web 1 which is stretched in the longitudinal direction in the stretching slot S1 between the holding roller 21 and the first embossing roller 3 experiences another stretching in the areas surrounding the elevations 80 or indentations 81, which are arranged running radially around the elevations 80 or the indentations 81 and thus not only in the-longitudinal direction of the web 1, but rather also in the transverse direction, so that on the basis of the embossings, a quasi-biaxial microstretching of the web 1 is also obtained.

After the precomposite 1a, which is thus stretched in the longitudinal direction in the stretching slot S1 and is embossed in the stretch-embossing slot SP and is further stretched quasi-biaxially, passes through the stretch-embossing slot SP, the precomposite 1a is moved along in an adjustable wrapping of the embossing roller 4 in contact with the other surface, for example, the one having the nonwoven web 10. Thus the surface of the precomposite 1a, which has the nonwoven web 10, lies on the embossing surface of the embossing roller 4.

The embossing pattern on the embossing roller 4 essentially corresponds to the embossing pattern on the surface of the embossing roller 3, but is advantageously staggered with respect to it, so that the gridlike embossing patterns mesh into one another, in a dovetailing manner.

Via embossing roller 4, the precomposite 1a is also moved in an adjustable looping angle α2 and subsequent to the roller pair 5 with rollers 50, 51, is moved away in a partial looping, wherein the rollers 50, 51 of the second roller pair 5 are operated at a higher speed than the embossing roller 4 and also the embossing roller 3, and a second stretching slot S2 for the precomposite 1a is formed between the embossing roller 4 and the roller 50. Thus, the precomposite 1a is stretched as a result of the higher rotating speed of the second roller pair 5, so that another stretching is attained, above all, in the area of the nonembossed surfaces and thus another opening of the pores in the mineral filler-containing plastic film 11. Here too, a stretching is effected of, for example, 1:1.15 to 1:1.4, as in the first stretching slot S1.

After the precomposite 1a passes through the second holding roller pair 5 and is stretched twice in the longitudinal direction in the stretching slots S1 and S2 and is embossed in between on both surfaces in the stretch-embossing slot SP, the desired web 1 with good breathing properties is produced from the precomposite 1a in this way. As a result of the stretching and embossing of the plastic film 11, it exhibits particularly good breathing properties with a high waterproofness and at the same time, as a result of the embossing of the nonwoven web 10, it also exhibits a voluminous structure and a textile-like hand.

As shown in FIG. 1, the obtained web 1 with good breathing properties is supplied subsequently to a tempering roller 6, on which it is tempered and then arrives, via a draw-off roller 7, at a wind-up device which is no longer depicted here, from which it can be supplied to further processing.

For adaptation to different raw materials and different product requirements, all rollers shown in FIG. 1, rollers 20, 21 of the first holding roller pair 2, the embossing rollers 3, 4, and the holding rollers 50, 51 of the second holding roller pair 5, and also the tempering roller 6 with different temperatures, can be tempered according to the requirement, wherein the embossing and stretching is carried out, for example, at a temperature of the precomposite of 90–98° C.

To be able to adapt the embossing pattern determined on the embossing rollers 3, 4 to different thicknesses of the nonwoven web 10 and plastic film 11 also, the holding roller pairs 2, 5 can be prolonged in their position, relative to the adjacent embossing roller 3 or 4 in accordance with the arrows A1 or A2. The pertinent looping angle α1 or α2 can be changed on the embossing rollers 3, 4. With smaller looping angles α1 or α2 and with the same embossing pattern on the embossing rollers 3, 4, it is possible to process a smaller layer thickness of the nonwoven web 10 and plastic film 11 of the precomposite 1a during a shorter effective time, whereas with increasingly large layer thickness, changes are made corresponding to the looping angles a α1 or α2 also and a constant function of the embossings is retained.

Thus the holding rollers 20, 21 of the holding roller pair 2 are supported by supporting arms 22 so they can swivel around the middle axis M3 of the embossing roller 3.

Likewise, the rollers 50, 51 of the roller pair 5 can swivel with supporting arms 52 on the middle axis M4 of the embossing roller 4.

The penetration depth of the embossing pattern and thus the effectiveness of the stretch-embossing in the stretch-embossing slot SP is adjusted by a radial adjustment T of the embossing roller 4 with respect to the embossing roller 3.

Embossing patterns with profile depths of the embossings up to one-hundred times the thickness of the nonembossed web 1 or its precomposite 1a can be attained.

The embossing rollers 3, 4 can alternately have embossing structures according to FIG. 3 either over their entire width, so that the precomposite 1a has embossings over the full surface, or can have only in segments such embossing patterns or different embossing patterns on their surfaces, so that a segmented processing of the precomposite 1a for the web 1 with good breathing properties can be undertaken.

A monolayer web 1 with good breathing properties of one filler-containing, mono- or multilayer plastic film can be produced in the same way. Here, higher stretchings of, for example, up to 1:2, as a whole up to 1:4, can be produced in the stretching slots S1 and S2, however.

The webs with good breathing properties produced in such a manner are particularly suitable for use in the hygiene area as so-called back sheets for diapers and the like, because of their very good breathing properties and waterproofness and their textile hand, and they are also suitable for uses in the textile and clothing industry, in which value is attached to a textile-like hand and low noise generation of the used webs with good breathing properties.

German Patent Reference 101 43 420.0, the priority document corresponding to this invention, and its teachings are incorporated, by reference, into this specification.

What is claimed is:

1. In a method for production of a web with good breathing properties, which is formed from at least one layer based on a mineral filler-containing plastic film, wherein the web is stretched so that the good breathing properties of the filler-containing plastic film are retained, the improvement comprising: stretching the web in two successive steps in a longitudinal direction of the web; and embossing on a surface of the web at least in areas, between the two steps of stretching in the longitudinal direction, wherein the web is embossed in a stretch-embossing slot (SP) formed between two embossing rollers (3,4), wherein the web is first supplied via a holding roller pair (20,21) to the first embossing roller (3), with the formation of a first stretching slot (S1), and is stretched in the longitudinal direction in the stretching slot (S1), then is conducted to the stretch-embossing slot (SP) with a first partial looping of the first embossing roller (3), and after passing through the stretch-embossing slot (SP) with a second partial looping of the second embossing roller (4) is conducted away and subsequently is conducted between the embossing roller (4) and the roller pair (50, 51) via the roller pair (50,51) with a formation of a second stretching slot (S2), and the web is stretched again in the longitudinal direction in the second stretching slot (S2).

2. In the method according to claim 1, wherein the web is stretched biaxially, in a limited manner, locally, by embossings.

3. In a method for production of a web with good breathing properties, which is formed from at least one layer based on a mineral filler-containing plastic film, wherein the web is stretched so that the good breathing properties of the filler-containing plastic film are retained, the improvement comprising: stretching the web in two successive steps in a longitudinal direction of the web; and embossing on a surface of the web at least in areas, between the two steps of stretching in the longitudinal direction, wherein both surfaces of the web are alternately embossed with embossings which are arranged in grids and are geometrically staggered with respect to one another, and which correspond with one another so that with the formation of an indentation in one of the surfaces of the web, an elevation is formed on an other of the surfaces in a corresponding area.

4. In the method according to claim 3, wherein the web is embossed in a stretch-embossing slot (SP) formed between two embossing rollers (3,4), wherein the web is first supplied via a holding roller pair (20,21) to the first embossing roller (3), with the formation of a first stretching slot (S1), and is stretched in the longitudinal direction in the stretching slot (S1), then is conducted to the stretch-embossing slot (SP) with a first partial looping of the first embossing roller (3), and after passing through the stretch-embossing slot (SP) with a second partial looping of the second embossing roller (4) is conducted away and subsequently is conducted between the embossing roller (4) and the roller pair (50, 51) via the roller pair (50,51) with a formation of a second stretching slot (S2), and the web is stretched again in the longitudinal direction in the second stretching slot (S2).

5. In the method according to claim 4, wherein the embossing rollers (3,4) are driven at a same speed and in an opposite rotating direction, and the holding roller pair (20, 21) and the roller pair (50,51) are driven at speeds which are independently adjustable.

6. In the method according to claim 1, wherein looping angles (α1,α2) of the web on the embossing rollers (3,4) are changeable.

7. In the method according to claim 6, wherein both surfaces of the web are alternately embossed with embossings which are arranged in grids and are geometrically staggered with respect to one another, and which correspond with one another so that with the formation of an indentation in one of the surfaces of the web, an elevation is formed on an other of the surfaces in a corresponding area.

8. In the method according to claim 7, wherein one of conical and truncated pyramid embossings are imprinted onto the web.

9. In the method according to claim 8, wherein a depth of the embossings in the web is changeable.

10. In the method according to claim 9, wherein the web is preheated before the embossing and the stretching.

11. In the method according to claim 10, wherein the stretching of the web is carried out in the longitudinal direction at a web temperature of approximately 90–98° C.

12. In the method according to claim 11, wherein a profile depth of the embossings is produced to one hundred times a thickness of the nonembossed web.

13. In the method according to claim 12, wherein the web is one of a monolayer web and a multilayer web made of a filler-containing plastic film with a thickness of approximately 20 to 50 $\mu$m and the web is stretched in a ratio of up to 1:2 at the longitudinal direction in the two steps.

14. In the method according to claim 12, wherein the web has a first layer of a nonwoven web based on at least one of plastic filaments and plastic fibers with a first weight per unit area of 10–50 g/m$^2$, and a second layer of a filler-containing plastic film with a second weight per unit area of 5 to 35 g/m$^2$ joined adhesively with the first layer, and the web is stretched at a ratio of 1:1.15 to 1:1.4 in the longitudinal direction in the two steps.

15. In the method according to claim 14, wherein the web is conducted to the stretch-embossing (SP) with placement of the surface which has the plastic film on the embossing roller (3), and is conducted away from the stretch-embossing slot (SP) with placement of the surface with the nonwoven web on the embossing roller (4).

16. In the method according to claim 15, wherein the web is of a plastic film (11) with a content of up to 70% of a mineral filler.

17. In the method according to claim 16, wherein the web is formed of polyolefins.

18. In the method according to claim 17, wherein the web is tempered after the stretching and the embossing.

19. In the method according to claim 1, wherein the embossing rollers (3,4) are driven at a same speed and in an opposite rotating direction, and the holding roller pair (20, 21) and the roller pair (50,51) are driven at speeds which are independently adjustable.

20. In the method according to claim 4, wherein looping angles ($\alpha$1,$\alpha$2) of the web on the embossing rollers (3,4) are changeable.

21. In the method according to claim 3, wherein one of conical and truncated pyramid embossings are imprinted onto the web.

22. In a method for production of a web with good breathing properties, which is formed from at least one layer based on a mineral filler-containing plastic film, wherein the web is stretched so that the good breathing properties of the filler-containing plastic film are retained, the improvement comprising: stretching the web in two successive steps in a longitudinal direction of the web; and embossing on a surface of the web at least in areas, between the two steps of stretching in the longitudinal direction, wherein the web is preheated before the embossing and the stretching.

23. In the method according to claim 1, wherein the stretching of the web is carried out in the longitudinal direction at a web temperature of approximately 90–98° C.

24. In a method for production of a web with good breathing properties, which is formed from at least one layer based on a mineral filler-containing plastic film, wherein the web is stretched so that the good breathing properties of the filler-containing plastic film are retained, the improvement comprising: stretching the web in two successive steps in a longitudinal direction of the web; and embossing on a surface of the web at least in areas, between the two steps of stretching in the longitudinal direction, wherein a profile depth of embossings is produced to one hundred times a thickness of the nonembossed web.

25. In the method according to claim 1, wherein the web is one of a monolayer web and a multilayer web made of a filler-containing plastic film with a thickness of approximately 20 to 50 $\mu$m and the web is stretched in a ratio of up to 1:2 at the longitudinal direction in the two steps.

26. In a method for production of a web with good breathing properties, which is formed from at least one layer based on a mineral filler-containing plastic film, wherein the web is stretched so that the good breathing properties of the filler-containing plastic film are retained, the improvement comprising: stretching the web in two successive steps in a longitudinal direction of the web; and embossing on a surface of the web at least in areas, between the two steps of stretching in the longitudinal direction, wherein the web has a first layer of a nonwoven web based on at least one of plastic filaments and plastic fibers with a first weight per unit area of 10–50 g/m$^2$, and a second layer of a filler-containing plastic film with a second weight per unit area of 5 to 35 g/m$^2$ joined adhesively with the first layer, and the web is stretched at a ratio of 1:1.15 to 1:1.4 in the longitudinal direction in the two steps.

27. In the method according to claim 26, wherein the web is conducted to a stretch-embossing (SP) with placement of a surface of the web which has a plastic film on a first embossing roller (3), and is conducted away from a stretch-embossing slot (SP) with placement of the surface with the nonwoven web on a second embossing roller (4).

28. In the method according to claim 1, wherein the web is of a plastic film (11) with a content of up to 70% of a mineral filler.

29. In the method according to claim 1, wherein the web is formed of polyolefins.

30. In the method according to claim 1, wherein the web is tempered after the stretching and the embossing.

31. In the method according to claim 32, wherein the web is embossed in a stretch-embossing slot (SP) formed between two embossing rollers (3,4), wherein the web is first supplied via a holding roller pair (20,21) to the first embossing roller (3), with the formation of a first stretching slot (S1), and is stretched in the longitudinal direction in the stretching slot (S1), then is conducted to the stretch-embossing slot (SP) with a first partial looping of the first embossing roller (3), and after passing through the stretch-embossing slot (SP) with a second partial looping of the second embossing roller (4) is conducted away and subsequently is conducted between the embossing roller (4) and the roller pair (50, 51) via the roller pair (50,51) with a formation of a second stretching slot (S2), and the web is stretched again in the longitudinal direction in the second stretching slot (S2).

32. In the method according to claim 31, wherein the embossing rollers (3,4) are driven at a same speed and in an opposite rotating direction, and the holding roller pair (20, 21) and the roller pair (50,51) are driven at speeds which are independently adjustable.

33. In the method according to claim 31, wherein looping angles ($\alpha$1,$\alpha$2) of the web on the embossing rollers (3,4) are changeable.

34. In the method according to claim 24, wherein the web is embossed in a stretch-embossing slot (SP) formed between two embossing rollers (3,4), wherein the web is first supplied via a holding roller pair (20,21) to the first embossing roller (3), with the formation of a first stretching slot (S1), and is stretched in the longitudinal direction in the stretching slot (S1), then is conducted to the stretch-embossing slot (SP) with a first partial looping of the first embossing roller (3), and after passing through the stretch-embossing slot (SP) with a second partial looping of the second embossing roller (4) is conducted away and subsequently is conducted between the embossing roller (4) and the roller pair (50, 51) via the roller pair (50,51) with a formation of a second stretching slot (S2), and the web is stretched again in the longitudinal direction in the second stretching slot (S2).

35. In the method according to claim 34, wherein the embossing rollers (3,4) are driven at a same speed and in an opposite rotating direction, and the holding roller pair (20, 21) and the roller pair (50,51) are driven at speeds which are independently adjustable.

36. In the method according to claim 34, wherein the stretch-embossing slot (SP) has an adjustable height between the embossing rollers (3,4).

37. In the method according to claim 34, wherein looping angles ($\alpha 1, \alpha 2$) of the web on the embossing rollers (3,4) are changeable.

38. In the method according to claim 26, wherein the web is embossed in a stretch-embossing slot (SP) formed between two embossing rollers (3,4), wherein the web is first supplied via a holding roller pair (20,21) to the first embossing roller (3), with the formation of a first stretching slot (S1), and is stretched in the longitudinal direction in the stretching slot (S1), then is conducted to the stretch-embossing slot (SP) with a first partial looping of the first embossing roller (3), and after passing through the stretch-embossing slot (SP) with a second partial looping of the second embossing roller (4) is conducted away and subsequently is conducted between the embossing roller (4) and the roller pair (50, 51) via the roller pair (50,51) with a formation of a second stretching slot (S2), and the web is stretched again in the longitudinal direction in the second stretching slot (S2).

39. In the method according to claim 38, wherein the embossing rollers (3,4) are driven at a same speed and in an opposite rotating direction, and the holding roller pair (20, 21) and the roller pair (50,51) are driven at speeds which are independently adjustable.

40. In the method according to claim 38, wherein looping angles ($\alpha 1, \alpha 2$) of the web on the embossing rollers (3,4) are changeable.

* * * * *